United States Patent
Fournier et al.

(10) Patent No.: US 10,828,712 B2
(45) Date of Patent: Nov. 10, 2020

(54) METHOD OF WELDING CONDUIT COMPONENTS OF A HEAT EXCHANGER AND BACKING DEVICE THEREFORE

(71) Applicant: PRATT & WHITNEY CANADA CORP., Longueuil (CA)

(72) Inventors: Jean Fournier, Longueuil (CA); Samuel Panero, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 49 days.

(21) Appl. No.: 16/000,430

(22) Filed: Jun. 5, 2018

(65) Prior Publication Data
US 2019/0366464 A1    Dec. 5, 2019

(51) Int. Cl.
| | |
|---|---|
| *B23K 9/035* | (2006.01) |
| *B23P 15/26* | (2006.01) |
| *B23K 9/16* | (2006.01) |
| *B23K 9/028* | (2006.01) |
| *B23K 101/14* | (2006.01) |
| *B23K 103/10* | (2006.01) |

(52) U.S. Cl.
CPC ............ *B23K 9/035* (2013.01); *B23K 9/0282* (2013.01); *B23K 9/164* (2013.01); *B23P 15/26* (2013.01); *B23K 2101/14* (2018.08); *B23K 2103/10* (2018.08)

(58) Field of Classification Search
CPC ...... B23K 9/035; B23K 9/0282; B23K 9/164; B23K 2103/10; B23K 2101/14; B23P 15/26
See application file for complete search history.

(56) References Cited

U.S. PATENT DOCUMENTS

| | | | | |
|---|---|---|---|---|
| 2,623,148 | A |   | 12/1952 | Ronay |
| 2,649,527 | A | * | 8/1953 | Chapman ............... B23K 13/06 |
| | | | | 219/611 |
| 2,747,065 | A | * | 5/1956 | Diehl .................... B23K 9/035 |
| | | | | 219/74 |

(Continued)

FOREIGN PATENT DOCUMENTS

| | | |
|---|---|---|
| CN | 101708566 | 5/2010 |
| GB | 375409 | 8/1961 |

OTHER PUBLICATIONS

Hermann Jacob Roos, Lost Core Technology, Bühler, 13. internationaler Deutscher Druckgusstag, 2013.

(Continued)

*Primary Examiner* — David P Bryant
*Assistant Examiner* — Nirvana Deonauth
(74) *Attorney, Agent, or Firm* — Alexandre Daoust; Norton Rose Fulbright Canada LLP

(57) ABSTRACT

The method can include inserting a first portion of a backing device into a fluid aperture of a first conduit component, inserting a second portion of the backing device into a fluid aperture of a second conduit component, and bringing the second conduit component adjacent the first component over the backing device, fusion welding the first conduit component to the second conduit over the backing device, and removing the backing device by circulating a fluid inside the welded conduit components. The backing device can be made of a soluble material.

10 Claims, 4 Drawing Sheets

(56) References Cited

U.S. PATENT DOCUMENTS

| | | | |
|---|---|---|---|
| 2,820,427 A * | 1/1958 | Chyle | B23K 9/035 |
| | | | 228/50 |
| 3,135,047 A | 6/1964 | Houser | |
| 7,028,881 B2 | 4/2006 | Ditzel et al. | |
| 7,530,487 B2 | 5/2009 | Kyriakoglou | |
| 2003/0127493 A1* | 7/2003 | Ciriza | B23K 9/0282 |
| | | | 228/42 |
| 2005/0061858 A1* | 3/2005 | Ditzel | B23K 37/06 |
| | | | 228/248.1 |

OTHER PUBLICATIONS

Ceramtec, Complex Cavities in Casting Components with Salt-based Cores Water-soluble, https://www.ceramtec.com/foundry-cores/, Retrieved from the Internet on May 16, 2018.

Fraunhofer, Cast Salt Cores, Fraunhofer Institute for Manufacturing Technology and Advanced Materials IFAM, https://www.ifam.fraunhofer.de/content/dam/ifam/en/documents/Shaping_Functional_Materials/casting_technology/cast_salt_cores_fraunhofer_ifam.pdf, Retrieved from the Internet on May 16, 2018.

* cited by examiner

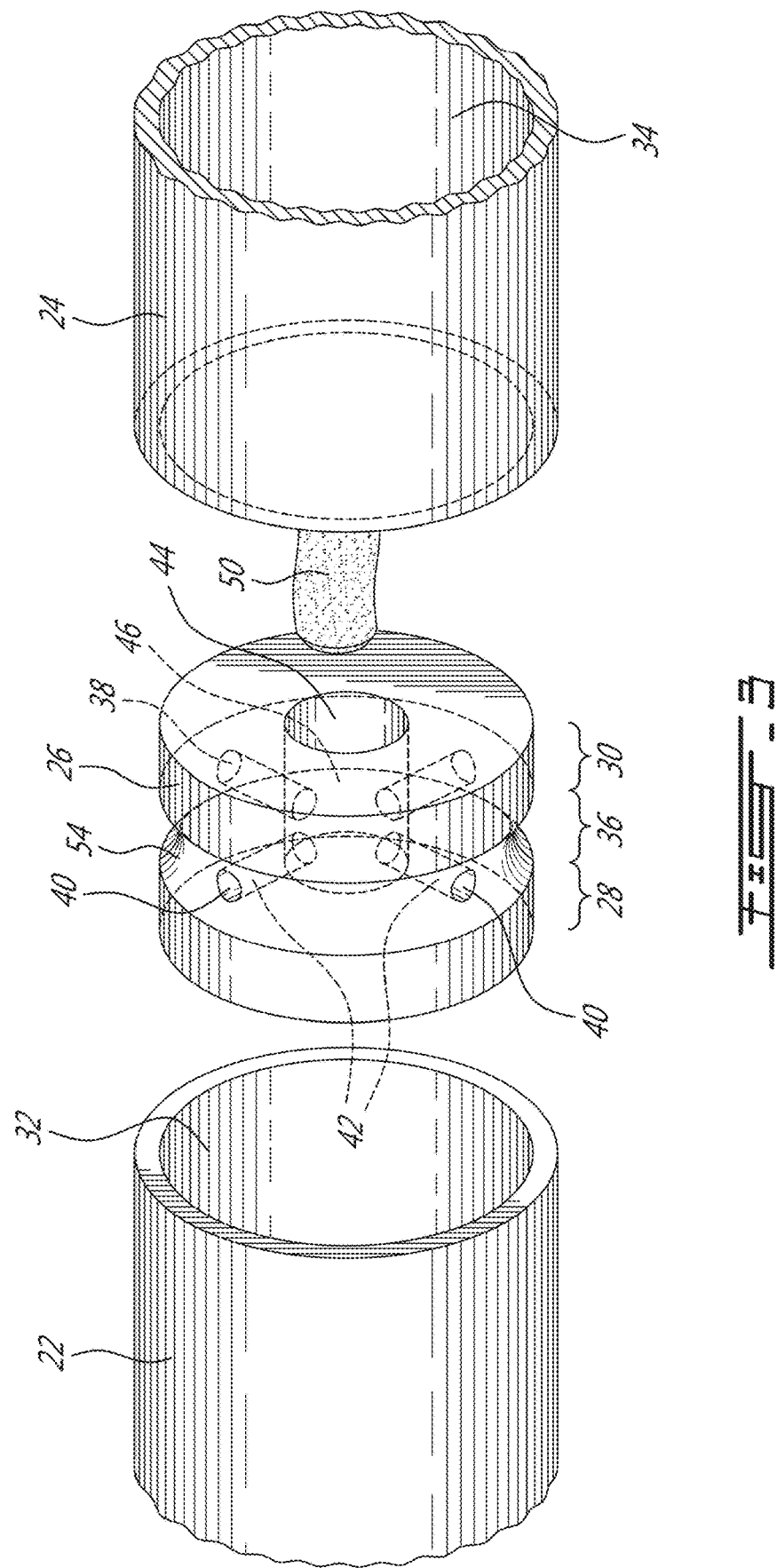

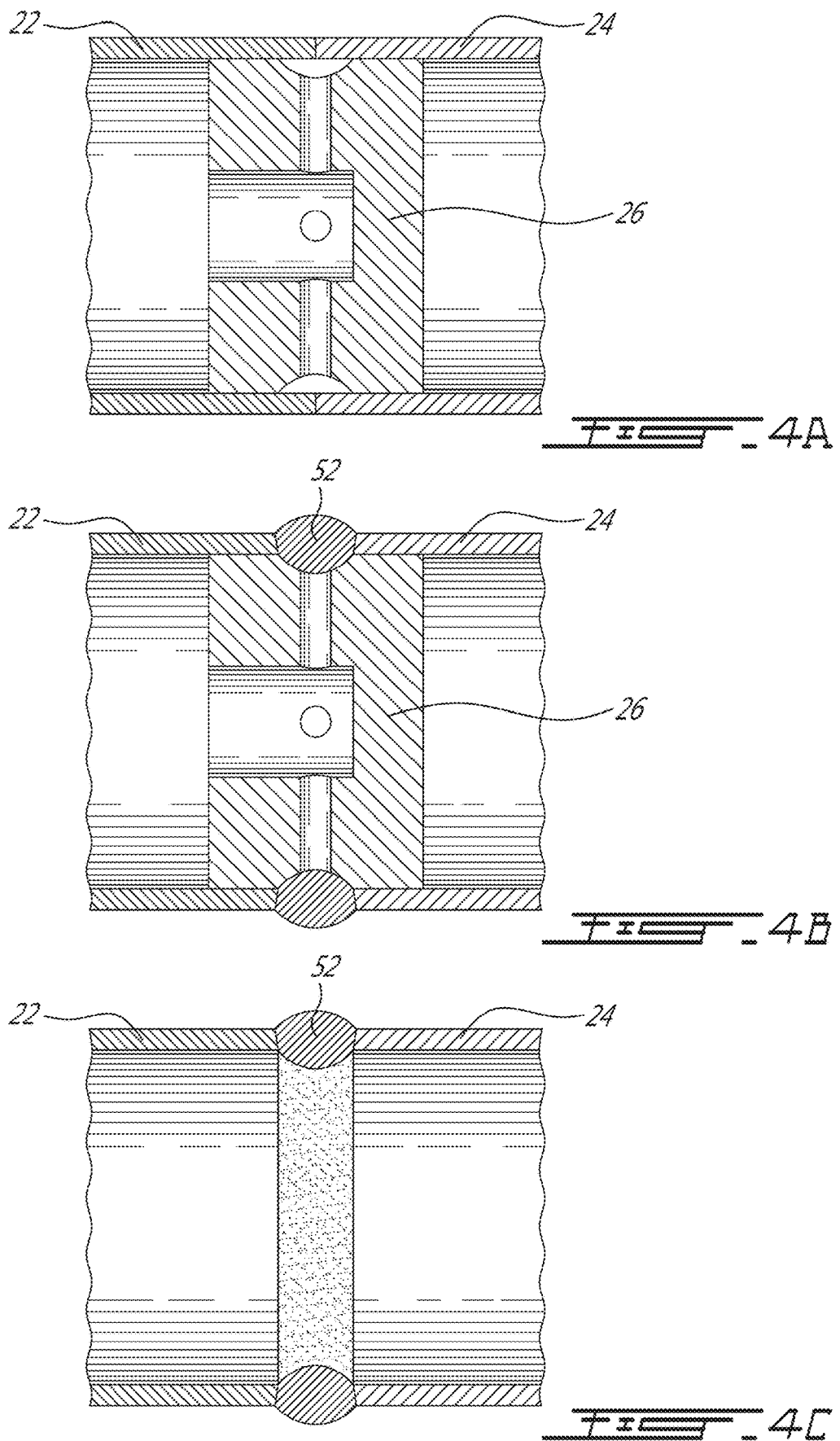

ived the need to weld conduit components of a heat exchanger. For instance, it can be desired to weld an end of a first conduit component to an end of a second conduit component for a fluid passage to extend internally between the conduit components thereafter. In some situations, the portion of the fluid passage which extends across the welded area can be restricted to access during and after welding, particularly when the conduit components are long or have complex shapes.

METHOD OF WELDING CONDUIT COMPONENTS OF A HEAT EXCHANGER AND BACKING DEVICE THEREFORE

TECHNICAL FIELD

The application related generally to heat exchangers and, more particularly, to a method of welding conduit components thereof.

BACKGROUND OF THE ART

A specific challenge can occur when welding components of fluid conduit of a heat exchanger. For instance, it can be desired to weld an end of a first conduit component to an end of a second conduit component for a fluid passage to extend internally between the conduit components thereafter. In some situations, the portion of the fluid passage which extends across the welded area can be restricted to access during and after welding, particularly when the conduit components are long or have complex shapes.

FIGS. 2A, 2B and 2C are pictures taken inside an example fluid passage, in a portion of a first conduit component which leads to a welded fluid conduit connection. As shown, during the welding operation which was conducted from the outside of the fluid passage, the fused metal formed a protrusion inside the fluid passage. This geometry protruding into the fluid passage is referred to as the root reinforcement, or melt-through. While the formation of a protrusion forming an internal bulge is often perfectly acceptable, and can even be desired, in this case, the melt-through extends undesirably far into the fluid passage and can cause an undesirable interference to fluid flow within the passage. The interference with the fluid flow can affect performances of the heat exchanger's fluid passage, such as the differential pressure for instance, and is undesirable.

Accordingly, there remained room for improvement.

SUMMARY

In one aspect, there is provided a method of making a heat exchanger, comprising: inserting a first portion of a backing device into a fluid aperture of a first conduit component; inserting a second portion of the backing device into a fluid aperture of a second conduit component, and bringing the second conduit component adjacent the first component over the backing device; fusion welding the first conduit component to the second conduit over the backing device; removing the backing device by circulating a fluid inside the welded conduit components.

In another aspect, there is provided a backing device for welding a first conduit component to a second conduit component, the backing device comprising a first portion configured to be engaged in a fluid aperture of the first conduit component, and a second portion opposite the first portion and configured to be engaged in a fluid aperture of the second conduit component, the backing device being made of a soluble material.

DESCRIPTION OF THE DRAWINGS

Reference is now made to the accompanying figures in which:

FIG. 3 is a perspective view showing conduit components and a corresponding backing device prior to welding, in accordance with one example;

FIGS. 4A, 4B and 4C are schematic longitudinal cross-section views showing the steps of A) prior to welding, B) subsequent to welding and C) subsequent to removing the backing device.

DETAILED DESCRIPTION

Figure 1:
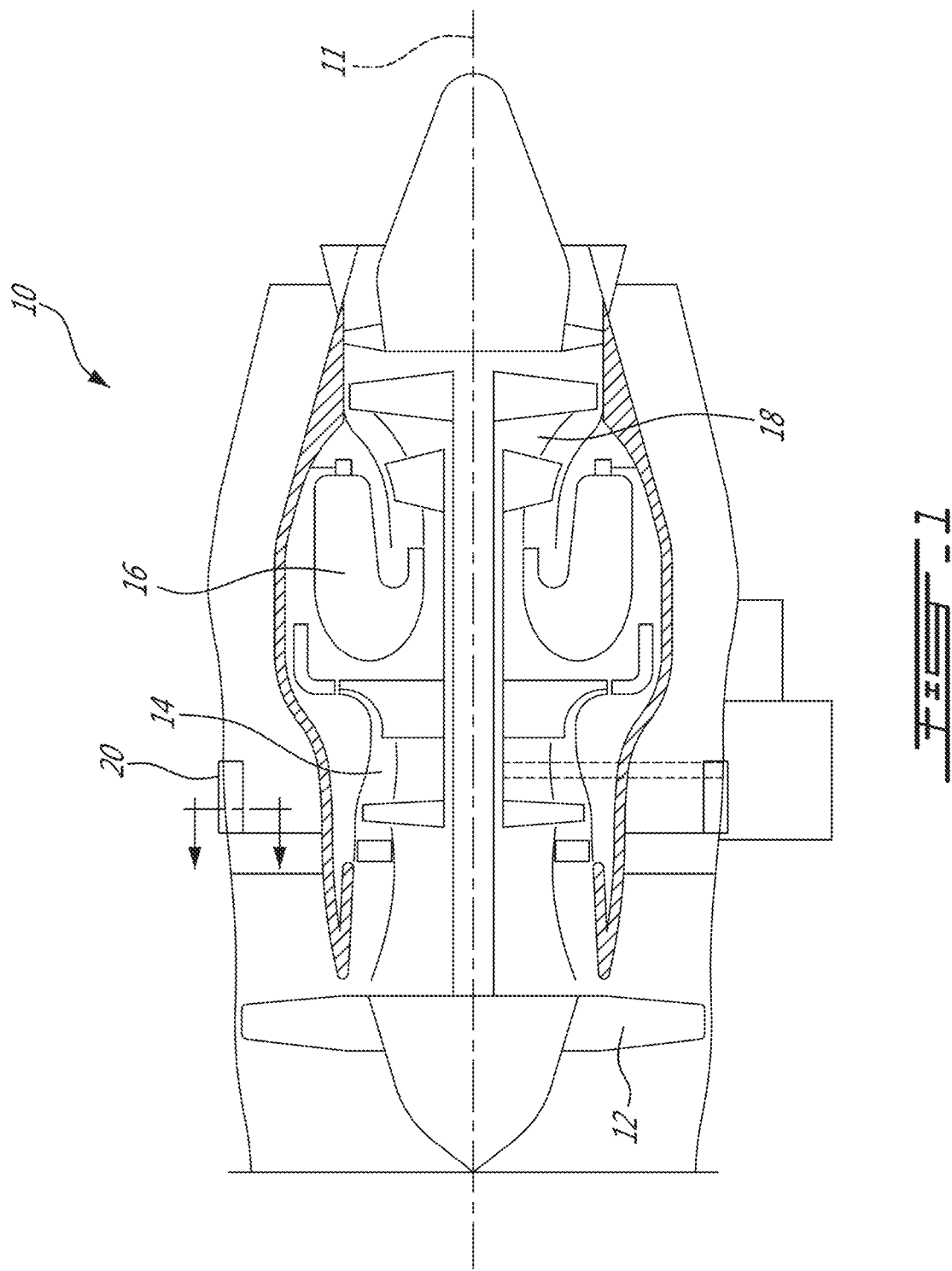
FIG. 1 is a schematic cross-sectional view of a gas turbine engine.
Figure 2C:
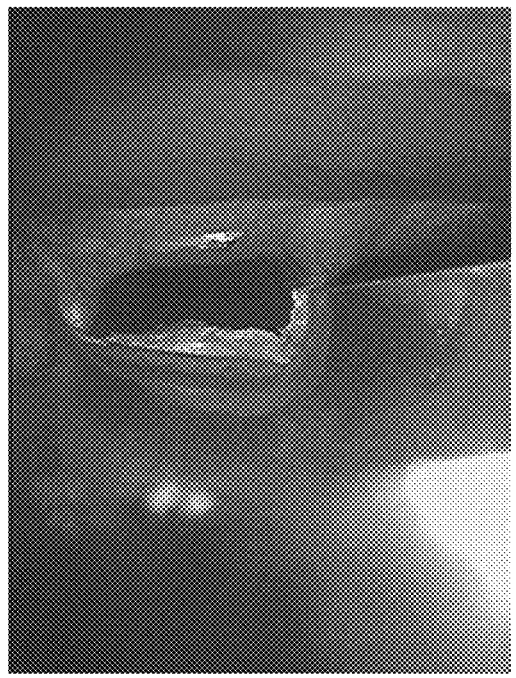
FIGS. 2A, 2B and 2C are pictures taken inside a fluid passage showing an excessive melt-through in welds.
Figure 2A:
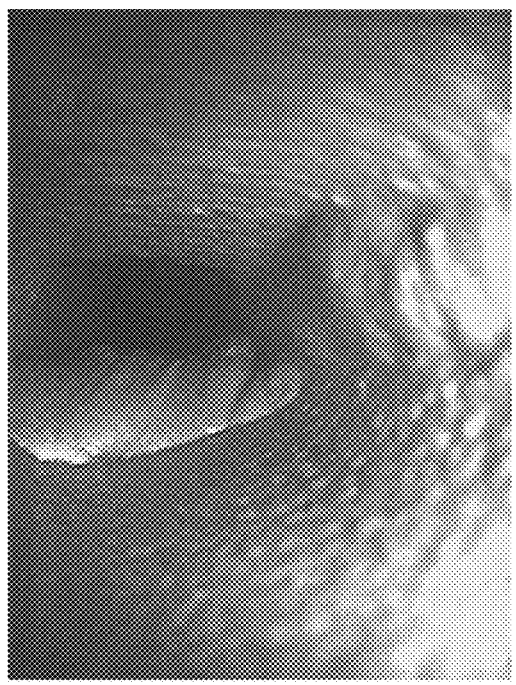
Figure 2B:

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Such a gas turbine engine 10 can include one or more heat exchangers, such as, for instance, an air-cooled oil cooler (ACOC) 20 surface-type heat exchanger.

Heat exchangers typically operate on the principle of exchanging the heat between two fluids. Typically, the two fluids are kept separate from one another and do not mix, but are placed in thermal contact in a manner to favor the transfer of heat from the hotter one of the fluids to the cooler one of the fluids. This typically involves providing heat exchangers with fluid passages which are separated from one another via a metal (thermally-conductive) partition. In the case of an air-cooled oil cooler, the fluid to be cooled, oil, is carried along a fluid passage which can be formed of one or more conduit components, some or all of which can be welded to one another in a manner that the oil is conveyed internally along the welded conduit components and across one or more welded joints along the fluid passage. Varying types of heat exchangers can be adapted to different fluids and can have different shapes and configurations. The internal fluid passage can have a restricted access, especially if the fluid passage is long and/or has a complex shape.

To address melt-through of the weld material into the fluid passage, one avenue is to use a backing device. Indeed, a backing device can provide a support surface under the weld which can prevent or limit melt-through. However, there can be several challenges to finding a suitable form of backing device.

A first challenge is to allow suitable removal of the backing device subsequent to the welding operation, to allow suitable fluid flow along the fluid passage during heat exchange operation of the heat exchanger. This challenged can be addressed to a certain extent by using a backing which can be destroyed and evacuated by circulating a fluid in the fluid passage after welding. However, this challenge can be particularly sensitive in the context of a heat exchanger which includes a matrix of tiny passages, capable of trapping very small grits or particles. This latter challenge can be addressed by making the backing device, or a main body thereof, out of a soluble material which dissolves in a solvent such as water for instance, which can reduce or eliminate the risk that small grits or particles remain trapped in the fluid passage. However, there remains additional challenges to address.

Another one of the challenges is that the weld can need to be protected internally by an inert gas during welding. This can raise the question of how to provide a passage for the inert gas across the backing device for instance. Moreover, the material of the backing device can need to be resistant to the welding temperatures (aluminum melts at 600° C.).

Some soluble organic materials, for instance, can emit gasses which can be undesirable to the welding process at welding temperatures. It was found that some salts, for instance, could represent satisfactory soluble materials for the backing device.

Accordingly, a backing device having a self-supporting structure and made of a satisfactory material can be used when welding a first conduit component to a second conduit component of a heat exchanger. The backing device can then be removed by circulating a fluid in the fluid passage extending along the first and second conduit components and across the weld, after the welding operation is complete.

A first example will now be discussed, in relation with the attached figures, though it will be understood that the general concept can be transposed and adapted to various embodiments and applications.

Turning to FIG. 3, in a first example, two tubular conduit components 22, 24 of a heat exchanger fluid passage are welded to one another. A backing device 26 made of a suitable material is provided. A first portion 28 of the backing device 26 is inserted into a fluid aperture 32 of a first one 22 of the conduit components and a second portion 30 of the backing device 26 is inserted into a fluid aperture 34 of the second one 24 of the conduit components. The ends of the first conduit component 22 and of the second conduit component 24 are brought adjacent to one another such as shown in FIG. 4A, are adjoined by the welding operation such as shown in FIG. 4B, and the backing device 26 can then be removed, leading to the configuration of FIG. 4C, by circulating a fluid in the fluid passage.

More specifically, and referring back to FIG. 4B, the adjacent ends of the first and second conduit components 22, 24 can be fusion welded to one another over the backing device 26 in a manner that the backing device 26 forms a support for the fused metal and limits the penetration distance of the fused metal into the fluid passage.

In the simple example shown in FIG. 3, the conduit components 22, 24 have a circular cross-section and it can be desired to weld the adjacent ends along the entire periphery of the circular cross-section, for instance. But it will be understood that in alternate embodiments, conduit components can have different shapes and configurations, and that in some cases, welding can be needed only along one or more partial portions of the periphery of the cross-section of the adjacent ends. For the purpose of ease of reference, the portion or portions of the backing device which support the fused metal during the welding will be referred to as a backing portion 36 of the backing device 26, and accordingly, it will be understood that the backing portion 36 can extend along a portion, or along an entirety of the periphery (transversal external face) of the backing device 26, depending on the application.

Referring back to FIG. 3, it will be understood that the shape and size of the portions 28, 30 of the backing device 26 which are inserted into the fluid apertures 32, 34 of corresponding conduit components 22, 24 are adapted for their intended purpose of being inserted into these fluid apertures 32, 34, and it can be desired that a relatively close fitting, or even a slightly interfering fit, be achieved in some embodiments. It will also be noted here that in the example shown in FIG. 3, the backing device 26 is designed to weld the ends of two conduit components 22, 24 to one another, but in alternate embodiments, it can be desired to adapt the backing device to welding the ends of three, or potentially more, conduit components to one another, in which case the backing device can be of a T shape, or of another suitable shape, having a corresponding number of portions configured to be inserted into the fluid apertures of the corresponding number of conduit components.

In some embodiments, it can be required to provide an inert gas delivery path 38 through the body of the backing device 26, to allow providing a suitable supply of an inert gas (e.g. argon for welding aluminum) to the fused metal during welding. In some embodiments, it can be preferred to have more than one adjacent inert gas delivery outlets 40 along the backing portion, and corresponding inert gas delivery conduits 42 can be provided in the backing device. The inert gas delivery conduits can form an inert gas delivery conduit network for instance.

In the example shown in FIG. 3, the backing device 26 is provided with an inlet 44 in an external face of one of the portions 30 of the backing device 26 which are adapted to be inserted into a corresponding conduit component 24. In this example, the inlet 44 communicates with a main central conduit 46, provided along an axial orientation parallel to the fluid passage in this case. The main central conduit 46 manifolds into a plurality of outlet conduits 42, which are radially extending, transversally to the fluid passage orientation, in this case. Each one of the outlet conduits 42 leads to a corresponding outlet 40 located along the backing portion 36 configured to receive the weld. During welding, an inert gas can be circulated across the backing device 26 and to the fused metal via the internal inert gas conduit network. In the illustrated embodiment, 6 outlet conduits/outlets 40, 42 are circumferentially distributed around the backing portion 36 of the backing device 26, but it will be understood that this configuration is only an example. The size of the outlet passages and the density of outlets along the backing portion can be selected specifically to be suitable as a function of the exact application for which the backing device can be designed, in alternate embodiments.

In the example shown in FIG. 3, it can be desired to connect a flexible inert gas supply line 50 to the inlet 44 of the backing device 26 before positioning the conduit components 22, 24 and the backing device 26 in the welding configuration shown in FIG. 4A, for instance, whereas in alternate embodiments, it can be preferred to convey the inert gas to the backing device via the fluid passage formed by a corresponding one of the conduit components, for instance. In the embodiment illustrated, the inert gas supply line can be removed before circulating the solvent fluid, for instance.

In the example shown in FIG. 3, the main central conduit 46 is blind and does not extend to the other conduit component 22. Indeed, in some embodiments, the pressure from the solvent fluid circulated inside the fluid passage can be sufficient to destroy the backing device 26. In alternate embodiments, it can be preferred to have some form of conduit extending across the backing device, from one conduit component to the other, for the solvent fluid to circulate thereacross and progressively "eat away" at the soluble material forming the body of the backing device, for instance. In still other alternate embodiments, the backing device can be made of a porous material and the pores in the material can allow circulation of inert gas to the fused metal, for instance.

As well-known and understood by persons having ordinary skill in the art, the formation of a bulge 52 (FIG. 4B or 4C) by the welding operation can be suitable. Accordingly, it can be preferred to provide the backing device 26, and more specifically the backing portion 36 thereof, with an elongated recessed channel 54 configured to extend along the weld and to receive fused metal in a manner to form an internal bulge 52 after the welding operation, such as shown for instance in FIGS. 4B and 4C. The shape of the recessed channel 54 can be specifically designed for this function, while still preventing a melt-through of the welded metal from extending undesirably deep into the fluid passage. In this example, the recessed channel 54 has a somewhat curved shape along its width, and can extend partially or fully around the periphery of the backing device, for instance. This shape will allow the weld metal to cast into a smooth transition geometry between the two components. If outlet conduits 42 and outlet apertures 40 are provided to feed an inert gas to the weld during welding, the outlet apertures 40 can be provided in the recessed channel 54.

The exact choice of the material for the backing device 26, or more specifically of a body thereof, can vary depending on the application and as a function of various factors such as the type of metal to be welded, the details of the removal process, etc.

In the case where the conduit components 22, 24 are made of aluminum, aluminum melts at 600° C. Accordingly, the material can be selected as a function of withstanding these temperatures. Sodium chloride, for instance, can be a suitable material and has a melting point at 800° C. Moreover, sodium chloride is soluble in water, and water can thus be used to remove the backing device, which can be advantageous over using another type of solvent due to its low cost, ready availability, non-toxicity and ease of disposal, for example. Sodium chloride can take the heat of welding on aluminum without melting or generating gas and, if made from a pure raw material, it can be expected to dissolve completely, not leaving any solid particles to become trapped in the fluid passage of the heat exchanger. However, sodium chloride will not be applicable to welding on nickel based alloys, steels or titanium, because of its low melting temperature compared to these base metals.

Other suitable candidates for forming the body of the backing device include calcium chloride, which has a melting point of 772° C. and is soluble in water or ethanol, or sodium carbonate, for instance, which has a melting point of 851° C. and which is soluble in water. Other materials can be suitable as well and the choice of the material can be left to the designer, as a function of the specific application.

The method of forming the backing device can also vary depending on a number of factors. In one embodiment, it was found suitable to form the backing device by obtaining a block of salt to provide a preform, and machining the preform using a CNC manufacturing method. In this manner, the external shape can be freely selected as a function of the intended application, such as for suitable penetration into the conduit components and suitable recessed channel to form a suitable bulge, for instance, and an internal conduit network can be formed by drilling into the material as desired. In alternate embodiments, other manufacturing methods can be preferred, such as moulding for instance, or a combination of manufacturing methods can be used. Indeed, it is possible that techniques used to form salt cores for casting will be adaptable to the formation of backing devices for welding. Indeed, Buhler™ provides HPDC casting machines which are adapted for salt core casting out of the liquid phase, and relatively complex geometries appear to be attainable. The Fraunhofer Institute for Manufacturing Technology and Advanced Materials IFAM also provides salt cores with interesting features, such as porous salt cores referred to as "Lost foam salt cores" in which the supporting structure can be variably porous. Moreover, CeramTec™ also manufactures salt-based cores for foundries.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A method of making a heat exchanger, comprising:
    inserting a first portion of a backing device into a fluid aperture of a first conduit component;
    inserting a second portion of the backing device into a fluid aperture of a second conduit component, and bringing the second conduit component adjacent the first component over the backing device;
    fusion welding the first conduit component to the second conduit over the backing device;
    removing the backing device by circulating a solvent fluid inside the welded conduit components;
    wherein said fusion welding further comprises circulating an inert gas across the backing device to one or more outlet exposed to a fused metal;
    further comprising inserting an inert gas delivery tube into an inlet of the backing device prior to said circulating an inert gas, and removing the inert gas delivery tube before circulating the solvent fluid; and
    wherein removing the backing device by circulating the solvent fluid includes dissolving the backing device.

2. The method of claim 1 wherein circulating the solvent fluid includes circulating water.

3. The method of claim 1 wherein said backing device comprises a recessed channel, further comprising receiving a bulge of fused metal in the recessed channel during welding.

4. The method of claim 3 further comprising forming the backing device including machining said recessed channel.

5. The method of claim 1 further comprising forming the backing device including machining conduits of a gas delivery network within a preform of the backing device.

6. The method of claim 1 wherein the first conduit component and the second conduit component are made of aluminum.

7. The method of claim 1, wherein dissolving the backing device includes dissolving the backing device made of sodium chloride with water.

8. The method of claim 7, wherein fusion welding the first conduit component to the second conduit includes fusion welding the first conduit and the second conduit being made of aluminum.

9. The method of claim 1, wherein circulating the inert gas across the backing device includes circulating the inert gas through a porous material of the backing device.

10. The method of claim 1, wherein removing the backing device includes exposing a weld joint to an interior of a welded assembly of the first conduit component and the second conduit.

* * * * *